(12) United States Patent
Delgado Arana (10) Patent No.: US 10,684,614 B2
(45) Date of Patent: Jun. 16, 2020

(54) FLEXIBLE PLANNING MODEL FOR FABRICATION WITH HIGH VOLUME AND HIGH MIXTURE

(71) Applicant: SKYWORKS SOLUTIONS, INC., Woburn, MA (US)

(72) Inventor: Eddy Martin Delgado Arana, Mexicali (MX)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 122 days.

(21) Appl. No.: 15/662,281

(22) Filed: Jul. 27, 2017

(65) Prior Publication Data

US 2018/0032065 A1 Feb. 1, 2018

Related U.S. Application Data

(60) Provisional application No. 62/367,546, filed on Jul. 27, 2016.

(51) Int. Cl.
*G05B 19/418* (2006.01)

(52) U.S. Cl.
CPC .......... *G05B 19/41865* (2013.01); *G05B 2219/32424* (2013.01); *G05B 2219/34418* (2013.01); *Y02P 90/20* (2015.11)

(58) Field of Classification Search
None
See application file for complete search history.

(56) References Cited

U.S. PATENT DOCUMENTS

| | | | |
|---|---|---|---|
| 6,349,237 B1* | 2/2002 | Koren | B23Q 37/00 700/96 |
| 6,795,742 B1* | 9/2004 | Ichikawa | G06Q 10/06 700/97 |

* cited by examiner

*Primary Examiner* — Carlos R Ortiz Rodriguez
(74) *Attorney, Agent, or Firm* — Chang & Hale LLP (57) ABSTRACT

Described herein are, among others, systems and methods associated with electrical test planning in a semiconductor manufacturing context. Within an electrical test planning system in the semiconductor industry, various models that allow a better utilization of installed capacity were developed. The workflow in the plant and the information flow in the electrical test planning area were analyzed to reduce or minimize setup times on the equipment. A paradigm shift is disclosed, with which planning is done at the product family level instead of at the level of the part number, starting with priority products required by the market.

20 Claims, 8 Drawing Sheets

FLEXIBLE PLANNING MODEL FOR FABRICATION WITH HIGH VOLUME AND HIGH MIXTURE

CROSS-REFERENCE TO RELATED APPLICATIONS

This application claims priority to U.S. Provisional Application No. 62/367,546 filed Jul. 27, 2016 and entitled "FLEXIBLE PLANNING MODEL FOR A HIGH TECH COMPANY WITH HIGH VOLUME-HIGH MIXTURE," which is expressly incorporated by reference herein in its entirety for all purposes.

BACKGROUND

Field

The present disclosure generally relates to planning models for semiconductor fabrication and testing.

Description of Related Art

The manufacturing process of a semiconductor or integrated circuit (IC) chips generally includes four major steps: wafer fabrication, wafer probe, assembly, and final testing. The number of semiconductor manufacturing machines or stations for executing each process is dictated by the properties of the semiconductor or chip. In semiconductor manufacturing facilities that employ a job shop scheme, semiconductors are manufactured by a process in which a plurality of units or bays each contain particular manufacturing equipment, and the semiconductors are conveyed between bays by a transfer robot, belt conveyor, or other conveyance. In semiconductor manufacturing facilities that employ a flow shop scheme, the semiconductor manufacturing equipment is provided in the sequence of processing steps. The flow shop scheme may increase productivity by reducing standby times, conveyance times within bays and between bays, and other wait times where similar processing steps are repeated. To increase productivity and efficiency of a facility employing a flow shop scheme, suitable management and scheduling can be implemented for the semiconductor manufacturing equipment or bays to improve utilization of the operating capacity of each piece of semiconductor manufacturing equipment used in the semiconductor manufacturing line.

SUMMARY

According to a number of implementations, the present disclosure relates to a method for scheduling production in a flow shop. The method includes grouping products into families based on geometric similarities; within a family, grouping products into lots; prioritizing lots within individual families; determining constraints on production and raw materials associated with production; and generating a production schedule that reduces changeover times by ordering lots within individual families.

In some embodiments, grouping products into families comprises analyzing characteristics of products to determine common characteristics between products. In further embodiments, grouping products into families further comprises assigning products to families wherein the products have identical geometries. In further embodiments, grouping products into families further comprises assigning products to families wherein the products have geometries that differ by less than 5%.

In some embodiments, prioritizing lots within individual families comprises determining customer demands associated with products and assigning a higher priority to those products. In further embodiments, prioritizing lots within individual families comprises assigning products to one of three priority levels. In further embodiments, a highest priority level corresponds to products that fulfill customer demands. In further embodiments, a lowest priority level corresponds to products that fulfill forecasted demands. In further embodiments, a middle priority level corresponds to products that buffer peak demands.

In some embodiments, the method also includes allocating production resources for individual families. In some embodiments, the method also includes assigning individual families to machines. In further embodiments, the method also includes producing one or more products based on the generated production schedule.

According to a number of implementations, the present disclosure relates to a planning system configured to generate a production schedule. The planning system includes a family module configured to group products into families based on geometric properties; a priority module configured to prioritize lots within individual families; a constraints module configured to determine production constraints and raw material constraints; a scheduling module configured to generate a production schedule that reduces changeover times by ordering lots within individual families based on priority and geometric similarity; and a controller configured to control operation of one or more modules of the planning system.

In some embodiments, the planning system also includes a planning data store that includes information regarding geometric properties of products to be produced. In further embodiments, the planning data store include information regarding customer orders. In further embodiments, the priority module is configured to analyze information regarding customer orders stored in the planning data store to prioritize lots within individual families. In further embodiments, the family module is configured to analyze information regarding geometric properties of products to group products into families.

In some embodiments, the scheduling module is further configured to generate the production schedule so that products from different families are process in parallel. In some embodiments, the scheduling module is further configured to generate the production schedule so that products with a higher priority are processed before products with a lower priority. In further embodiments, the priority module is configured to assign products to a higher priority where the products satisfy customer demands.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Introduction

The planning process is a common problem for any semiconductor manufacturing that is particularly difficult to resolve due to the large number of variables that affect the decisions to be made. That makes it difficult to optimize the total completion time, or makespan, of the products to be completed. In particular, production planning affects productivity in a high tech semiconductor company due at least in part to the high quantity of machine changeovers (e.g., machine or related changes in configurations or setups). A manufacturing work plan relates to the sequence of the production orders and it is advantageous that the schedule reduces or minimizes idle times caused by equipment changeovers or setups. Different kinds of changeovers cause varying amounts of delay ranging from small changeovers (e.g., a lot setup, a recipe setup, or a tool setup) to large changeovers (e.g., changing a product dimension).

In some flow shops, machine loading or sequencing is accomplished at the level of the product or part with a lack of consideration regarding any similarities in geometry of the products. As described herein, changing the geometry of products during testing (or manufacturing) causes larger transition times than changes caused by tool or recipe setups. This can reduce productivity of the shop. Such inefficient plans or schedules can arise when the plan or schedule assigns the first machine available to the next lot. Moreover, such inefficient plans or schedules can arise when the plan or schedule does not take into account changeover times for different sequences of products.

Accordingly, described herein are systems and methods for producing manufacturing schedules that reduce or limit changeover times by sequencing products having the same or similar product geometry to form production batches. This reduces wait times during manufacturing or testing by reducing the number of major setups between production batches, thereby reducing idle time caused by changing or adjusting machines or tools in the process. The systems and methods provide a flexible model for the manufacture planning in the electrical test area of a high-tech semiconductor company, with the characteristics of high-mix and high-volume. The systems and methods described herein reduce cycle makespan, increase on-time delivery, and reduce manufacture costs.

In some embodiments, the disclosed systems and methods group manufactured products into families primarily on the basis of similarity in geometries. Families can be defined based on various design or manufacturing attributes, such as, for example and without limitation, shape, size, surface texture, material type, raw material estate, or any combination of these. By grouping products based on technical similarities (such as geometries, electrical contact configuration, etc.) to schedule lots in batches reduces setup times on the machines and increases efficiency.

A makespan minimization problem that considers setup times and batch processing on machines is important in manufacturing industries, such as semiconductor manufacturers. It is NP-hard (e.g., a complex solution problem) even for basic or simple shop models. Given the problem complexity, solutions generally have a high computational cost. Disclosed herein are alternatives to high-cost algorithms, which are frequently unacceptable in real conditions of semiconductor manufacturing.

Described herein are, among others, systems and methods associated with electrical test planning in a semiconductor manufacturing context. Within an electrical test planning system in the semiconductor industry, various models that allow superior utilization of installed capacity are disclosed herein. The workflow in a manufacturing plant and information flow in electrical test planning systems were analyzed to develop systems and methods to reduce or minimize setup times on manufacturing and testing equipment. The disclosed systems and methods generate manufacturing schedules or plans based primarily on product families rather than product numbers. Within families, products can be prioritized based at least in part on customer and/or market demands.

In some embodiments, a planning system, a modeling method, a planning model, and/or a manufacture planning method can include one or more features, individually or in any combination, among the various examples disclosed herein. Although much of the disclosure refers to implementation in an electrical testing area, the disclosed systems and methods can be used to any discrete manufacturing business that sequences production orders. It should also be noted that the description refers to products and parts interchangeably, both referring to individual production units for manufacture or testing.

It should also be noted that the disclosed systems and methods are configured to reduce or optimize the maximum completion time (makespan) of all jobs in a schedule or plan. A performance measure used to evaluate a schedule is the maximum completion time (makespan) which can represent the throughput measure.

In addition, the systems and methods disclosed herein are directed to manufacturing schedules and plans for flow shops. A flow shop can be a multi-stage production system with more than one parallel machine at each stage. In a flow shop products go through the system unidirectionally, e.g., stage 1, then stage 2, and so on. A flexible flow shop includes shops where some products can skip some stages. In some flow shops, parallel machines at the same stage can be identical and can be limited to a single operation. However, in some semiconductor back-end facilities and in some other factories (with very different product families), parallel machines could belong to different machine types. Each machine type may be limited to processing a subset of product families and has a unique processing time for each product family. The machines used to test packaged chips can perform different types of tests, and there can be a minor setup time between different tests even for the products within the same lot. Similarly, there can be a minor setup time between testing different lots of the same product.

Figure 1:
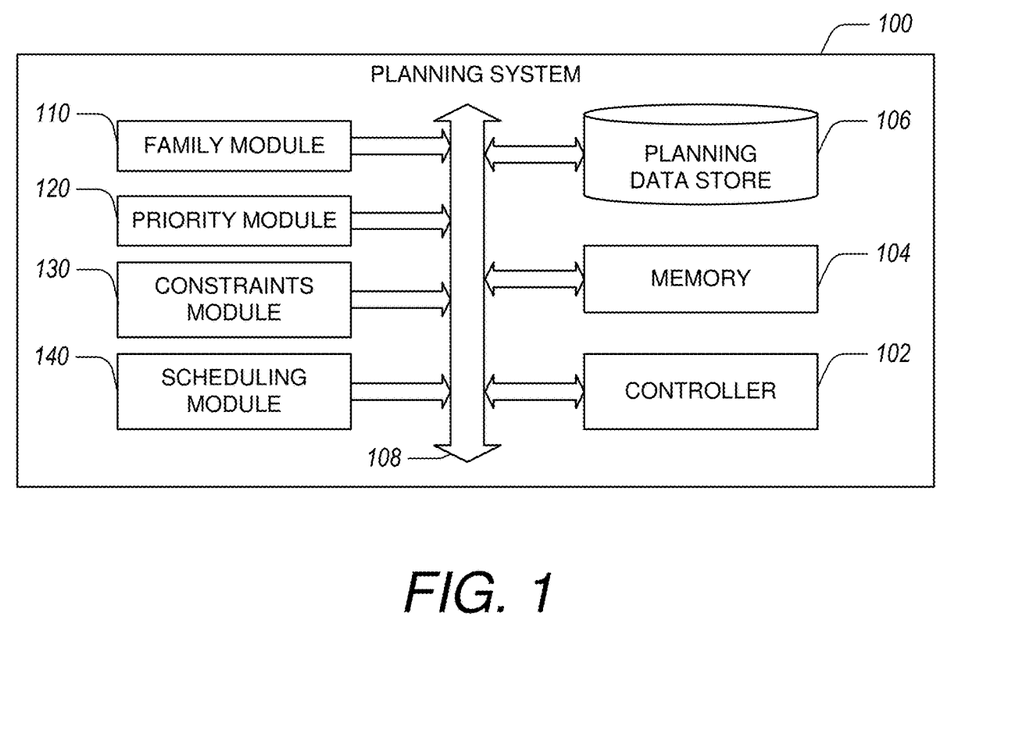
FIG. 1 illustrates a planning system in a semiconductor manufacturing facility setup with a flow shop scheme.

FIG. 1 illustrates a planning system 100 in a semiconductor manufacturing facility setup with a flow shop scheme. The planning system 100 is configured to generate a production plan based at least in part on product families to increase efficiency of the manufacturing facility. The planning system 100 can be configured to perform one or more of the methods described herein. For example, the planning system 100 can include a computer readable media, such as memory 104 and/or a planning data store 106, that includes computer-executable instructions configured to cause a controller 102 to perform one or more of the steps of the methods described herein.

The planning system 100 can include hardware, software, and/or firmware components used to group products into families, prioritize product production, determine machine changeover times, and to determine manufacture schedules that increase or optimize manufacturing efficiency of products. The planning system 100 can be configured to receive information from various sources of input and to automatically determine or update a production schedule based at least in part on the received information. The planning system 100 can include a controller 102, memory 104, a planning data store 106, a family module 110, a priority module 120, a constraints module 130, and a scheduling module 140. Components of the planning system 100 can communicate with one another, with external systems, and with other components of a manufacturing facility over communication bus 108. The planning system 100 can employ any method described herein for determining production schedules, including methods for grouping products into families, determining production priorities, and/or determining estimated changeover times for changing production to a different product or family. These include the methods described herein with respect to FIGS. 2, 3, 4, 7, and 9.

The planning system 100 includes the family module 110. The family module 110 can be configured to analyze data from the planning data store 106. The data can include, for example without limitation, product information, customer demands, previous sales, testing times associated with products, previous test results, and the like. Product information can include size, materials, electrical contact configuration, shape, surface texture, material type, raw material estate, and the like. The family module 110 can be configured to analyze the data in the planning data store 106 to group products into one or more families. This analysis can be provided automatically and can be updated automatically when new information related to products is provided in the planning data store 106. A family can be defined as a group of products having similarity in one or more product characteristics. In particular, a family can be defined as a group products having a similar geometry. In some embodiments, the family can be defined as products that cause small changeovers when changing lots. For example, products within a family cause changeovers such as lot set up, recipe set up, and/or tool set up. Changes between families cause large changeovers due to product dissimilarity. For example, products with dissimilar geometries can require family set up when changing between products of different lots that are within different families. The family module 110 can be configured to perform the method 200 described herein with reference to FIG. 2. In some embodiments, the family module 110 can be configured to perform any portion or step of the method 200, any portion of the method 700 described herein with reference to FIG. 7, or can be utilized in implementing the method 700 described herein with reference to FIG. 7.

By way of example, the family module 110 can be configured to analyze a plurality of products in the planning data store 106. The family module 110 can be configured to extract geometry information about the plurality of products. The family module 110 can be configured to group products based on similar geometry configurations. The family module 110 can be configured to create a family of products where the products have sufficiently similar geometries so that changing between products in the family does not cause a family changeover. For example, products within a family can have geometries that are similar to within about 10%, to within about 5%, were to within about 1%. In some embodiments, the geometry of the first product is similar to the geometry of second product where a length, width, and/or height of the first product are within a threshold amount of the length, width, and/or height of the second product. In some embodiments, family changeovers can be defined as any set of that requires more than about 150 minutes.

The planning system 100 includes the priority module 120. The priority module 120 can be configured to analyze data in the planning data store 106. The analysis of the data can include customer demands, previous production amounts, forecasted production amounts, buffer amounts, and the like. The priority module 120 can be configured to automatically analyze this data to determine priority groups based on one or more of those categories. This can be accomplished automatically and updated in real time. For example, when new customer requests arrive, when production forecasts are updated, or when similar changes occur, the priority module 120 can be configured to update priorities. The priority module 120 can be configured to assign priorities to lots within a family based on the analysis of the data. The priority module 120 can be configured to provide a fixed number of priority levels or it can be configured to generate a flexible number of priority levels. The priority module 120 can be configured to assign products to a defined priority level. Priority module 120 can be configured to analyze each family defined by the family module 110 and to assign priority to each product within that family. The priority module 120 can be configured to perform the method 300 described herein with reference to FIG. 3. The priority module 120 can be configured to perform any part of the method 300 described herein with reference to FIG. 3, any part of the method 700 described herein with reference to FIG. 7, or can be utilized in implementing the method of FIG. 7.

By way of example, the priority module 120 can be configured to find 3 priority levels. A first priority level can correspond to confirmed orders by customers. A second priority level can correspond to products to buffer demand peaks. A third priority level can correspond to products that satisfy forecasted future demands. The priority module 120 can assign equipment capacity to a family with products of the first priority level, and after that has been assigned, to assign products of the second priority level within the same family, and after that has been assigned, to assign products of the third priority level within the same family. The priority module 120 can analyze customer demands corresponding to particular products. This analysis can be used to assign priority within families determined by the family module 110. For each product within a family, the priority module 120 can assign a priority level to the product. This can be used by the scheduling module 140 to determine a manufacturing or testing schedule.

The planning system 100 includes the constraints module 130. The constraints module 130 can be configured to analyze data in the planning data store 106 wherein the data corresponds to capacity for production and raw material capacity. These capacities represent constraints on production or testing. Constraints can be related to equipment availability, material availability, and the like. The constraints module 130 can be configured to automatically generate constraint information that is passed to the scheduling module 142 facilitate schedule generation. The automatic generation of constraint information can be updated in real time based on changes to data in the planning data store 106. The constraints module 130 can be configured to indicate when a proposed production or testing plan violates one or more constraints. The constraints module 130 can be configured to absorb new orders were changes in orders such that when such changes occur the production plan can be modified to incorporate the changes without violating constraints. The constraints module 130 can be configured to perform the method 300 described herein with reference to FIG. 3. In some embodiments, the constraints module 130 can be implemented to perform any part of the method 300 described herein with reference to FIG. 3, any part of the method 700 described herein with reference to FIG. 7, or can be utilized to implement the method 700.

By way of example, the constraints module 130 can be configured to receive a proposed plan and to analyze the plan against production and/or raw material constraints. If the proposed plan violates those constraints, it can send a signal to the scheduling module 140 indicating that the proposed plan violates constraints. For example, if a proposed plan requires more machines than are available, the constraints module 130 can indicate that the proposed plan violates constraints. Similarly, if a proposed plan requires more raw materials and are available, the constraints module 130 can indicate that the proposed plan violates constraints.

As another example, the constraints module 130 can be configured to determine production and/or raw material constraints and provide that information to the scheduling module 140. The constraints module 130 can analyze the number of functioning machines and their roles to determine a production constraint. Similarly, the constraints module 130 can analyze available raw material to determine a raw materials constraint. Each of these constraints can be passed to the scheduling module 140 for use in generating a production plan.

The planning system 100 includes the scheduling module 140. The scheduling module can be configured to analyze families, priorities, and constraints from respective modules 110, 120, 130. The scheduling module 140 can use this information from these modules to automatically generate a production plan. The production plan can be updated by the scheduling module 140 when new information is received such as new customer orders, updates to constraints, and/or updates to priorities. These updates can occur in real-time or near real-time. For example, if during testing or production one or more products fails to arrive in time, the scheduling module 140 can be configured to update the production plan to increase or maximize machine utilization. The scheduling module 140 can be configured to allocate resources on a per family basis. The scheduling module 140 can be configured to assign lots within a family to appropriate or targeted machines. The scheduling module 140 can be configured to determine changeover times corresponding to lot sequences. This information can be used to arrange the order of the lots within a family to reduce or minimize changeover time, to increase machine utilization, the satisfy customer demands (e.g., based on priority), and the like. The scheduling module 140 can create production plans that are capable of processing families in parallel based on machine allocation and shop capacity (e.g., the number and types of machines available). To determine a production plan, the scheduling module 140 can perform an iterative procedure where it loops through families and for each family it loops through lots to determine lot order and family resource allocation and machine assignation. The output of the scheduling module 140 can be a production plan that can be implemented for any suitable period of time such as a day, week, 2 weeks, or longer. The scheduling module 140 can be configured to perform the method 700 described herein with reference to FIG. 7. In some embodiments, the scheduling module can be configured to implement any portion of the method 700 and/or any portion of the methods described herein with reference to FIGS. 2-4.

Each of the family module 110, the priority module 120, the constraints module 130, and the scheduling module 140 can include one or more software modules, hardware components, and/or firmware elements configured to receive input or information and to generate appropriate output, as described herein, including, for example, family groupings of products, priorities of families and/or products within families, changeover times, and production schedules. Each of the modules 110, 120, 130, 140 can include a computer processor, an application-specific integrated circuit (ASIC), a field programmable gate array (FPGA), or other suitable microprocessor. In some embodiments, one or more modules 110, 120, 130, 140 share a computer processor (e.g., the controller 102), memory (e.g., the memory 104), or data stores (e.g., the planning data store 106).

The planning system 100 includes a controller 102. The controller 102 can be configured to control operation of the modules 110, 120, 130, 140 as well as the memory 104 and/or the planning data store 106. The controller 102 can include any suitable microprocessor and other computing components configured to interface with the various modules, processors, and data stores of the planning system 100.

The planning system 100 includes memory 104. The memory 104 can be configured to store computer-executable instructions and other data related to calculations or algorithms being implemented in the planning system 100. The memory 104 can be any suitable memory device or devices including, for example and without limitation, random access memory, read-only memory, solid-state disks, hard drives, flash drives, bubble memory, and the like.

The planning system 100 includes the planning data store 106 configured to store information related to product properties (e.g., product geometries), machine changeover properties (e.g., changeover times from product to product), production capacity, raw material constraints, customer orders, forecasted demands, manufacturing facility properties, manufacturing equipment status, algorithms, executable instructions (e.g., instructions for the controller 102), and the like. The planning data store 106 can include one or more databases. The planning data store 106 can be any suitable data storage device or computer readable medium including, for example and without limitation, random access memory, read-only memory, solid-state disks, hard drives, flash drives, bubble memory, and the like. In some embodiments, a portion of the planning data store 106 can be accessible by the planning system through the Internet, such as where a portion of the planning data store 106 includes cloud-based storage.

Grouping Products into Families

Figure 2:
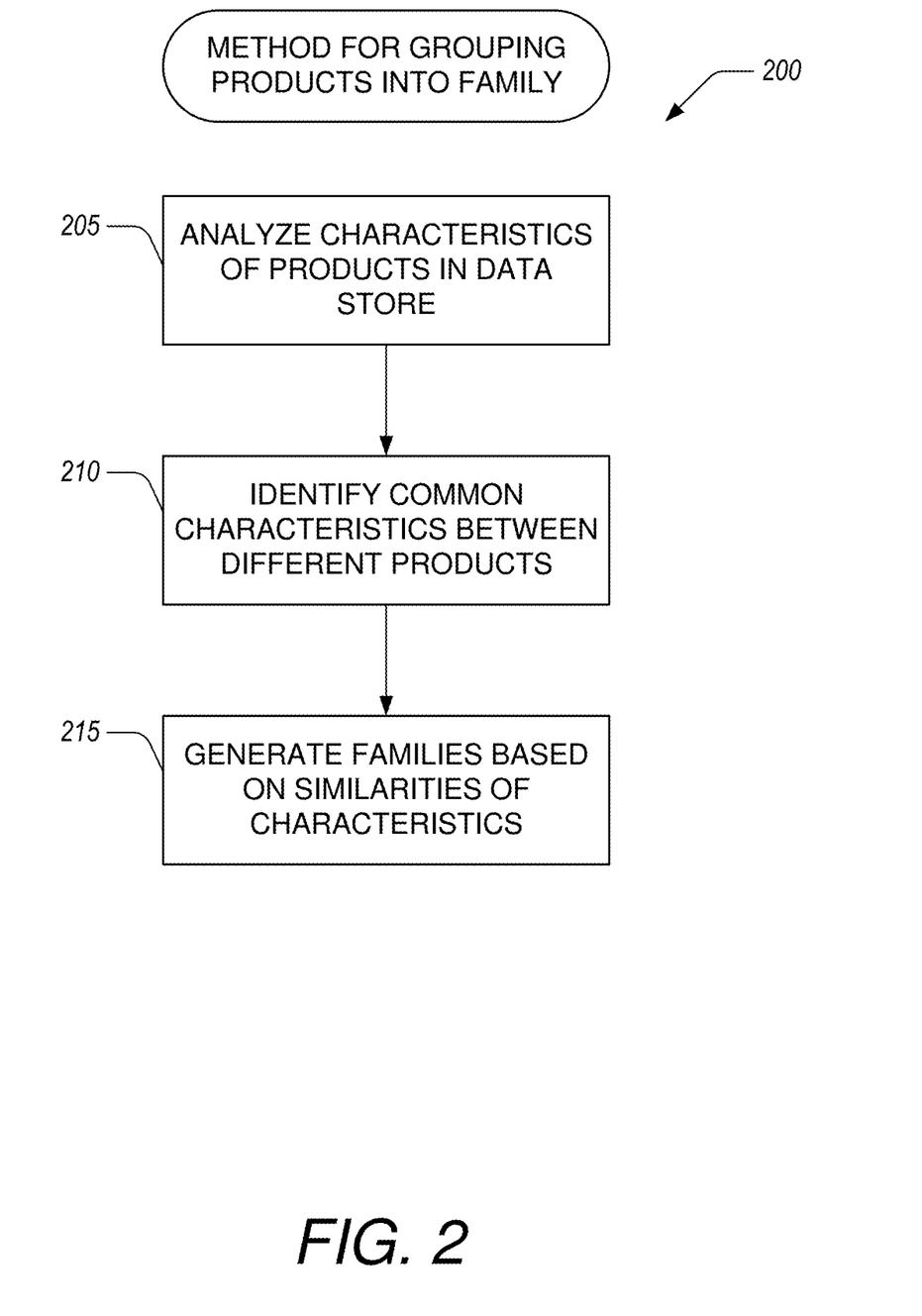
FIG. 2 illustrates a flow chart of an example method for grouping products into families.

FIG. 2 illustrates a flow chart of an example method 200 for grouping products into families. The method 200 can be implemented by the planning system 100 or the family module 110 described herein with reference to FIG. 1. For ease of description, the method 200 will be described as being performed by a planning system, such as the planning system 100 described herein with reference to FIG. 1. It should be understood, however, that any suitable system or module described herein can perform any step or any portion of a step in the method 200. Likewise, it should be understood that any suitable combination of systems or modules described herein can perform the method 200.

In some embodiments, a family represents products that share the same geometry (e.g., the size and the height) of the microcircuit. Similarly, a family can represent products that do not require major adjustments between lots. By managing planning with a focus on a product family rather than on a part number (product) level, improvements in plan efficiency can be realized. This can facilitate execution of the production plan and fulfillment when a product in the scheduled lot sequence is replaced by another one of a similar geometry, which is available for processing.

In step 205, the planning system analyzes characteristics of products in a data store. The characteristics can include design or manufacturing attributes such as, for example and without limitation, shape, size, surface texture, material type, raw material estate, or any combination of these. Merely by way of example, without intention to limit the disclosure, the method 200 focuses on creating families based on similar geometries. The planning system can be configured to determine ranges of the characteristics, variations in the characteristics, similarities or equivalences in the characteristics, and the like. This can be used to determine when a characteristic of a product is similar to another product.

In step 210, the planning system identifies common characteristics between different products. For example, the planning system can be configured to identify similar geometries where the geometries of products fall within targeted ranges. In some embodiments, based on the analysis in step 205, the planning system can determine product similarity based on variations between products. For example, where variations are less than 1%, 5%, or 10% the planning system can determine that those products have common characteristics. In particular, if the size and/or height of a product is within a targeted range of another product, the planning system can indicate that those products have common characteristics. The targeted range can be less than 1%, less than 5% and/or less than 10%.

In step 215, the planning system generates families based on similarities of characteristics. The planning system can use the results of the analysis in step 210 to group products into families. Where products have common characteristics, the products can be grouped into families by the planning system. Where products do not have common characteristics, the products can be put into different families by the planning system. Within a family, the planning system can group products into lots based on similarity of products. For example, lots can be assigned where products have the same part number. In some embodiments, lots can be assigned where products have identical geometries. In some embodiments, lots can be assigned where products have identical electrical contact configurations or other identical configurations. In some embodiments, families are limited to products that have identical geometries.

Figure 3:
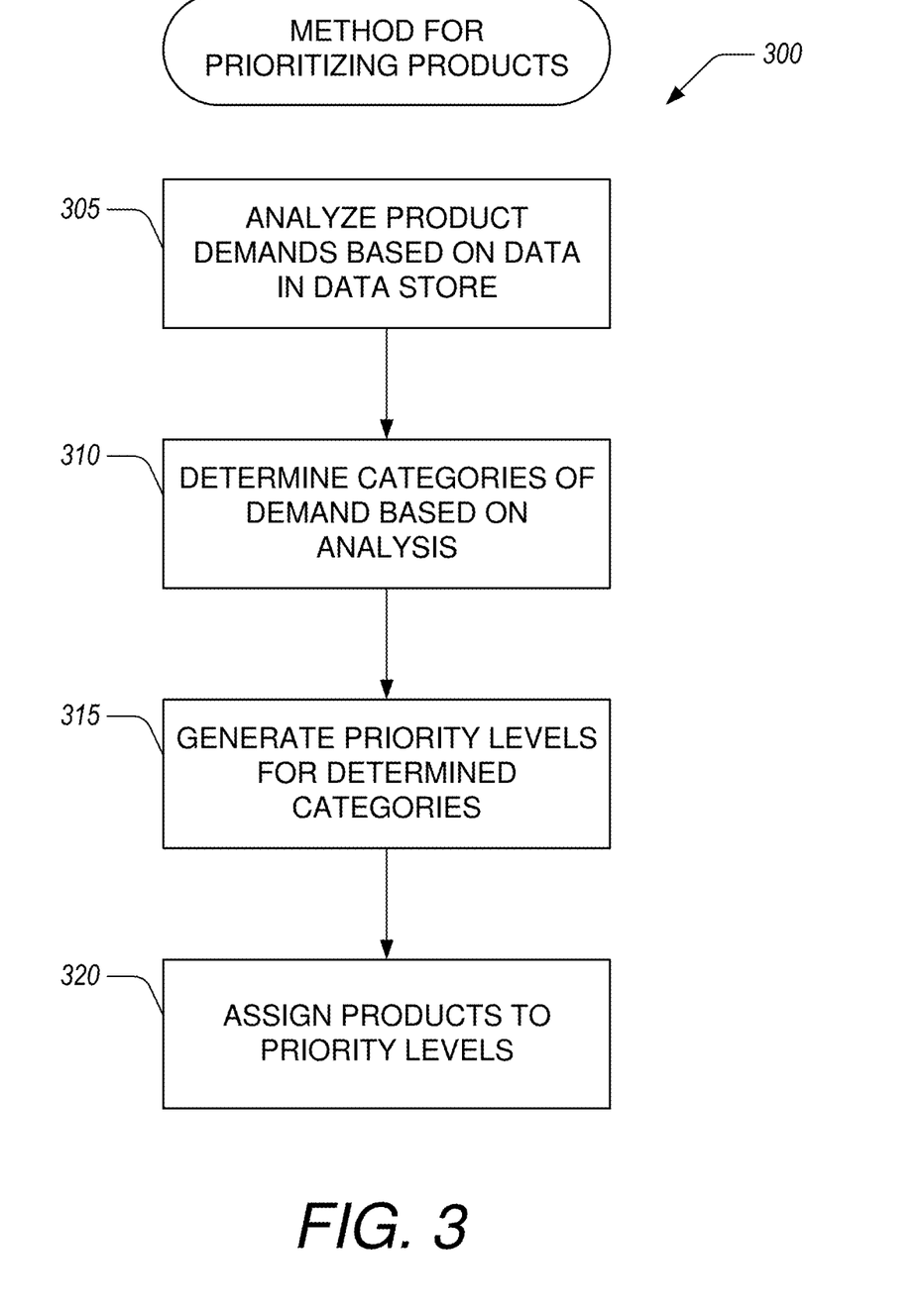
FIG. 3 illustrates a flow chart of an example method for prioritizing products within families.

Furthermore, product families can be established by classifying products according to priority as well as geometry. Priority can be determined based on the quantity of parts to be produced in each geometry. FIG. 3 illustrates a flow chart of an example method 300 for prioritizing products within families. The method 300 can be implemented by the planning system 100 or the priority module 120 described herein with reference to FIG. 1. For ease of description, the method 300 will be described as being performed by a planning system, such as the planning system 100 described herein with reference to FIG. 1. It should be understood, however, that any suitable system or module described herein can perform any step or any portion of a step in the method 300. Likewise, it should be understood that any suitable combination of systems or modules described herein can perform the method 200.

Planning can be implemented based at least in part on the following priorities where products are grouped into families. First, load the equipment capacity assigned to a family with products of highest priority. Second, once a product of the highest priority type completes its allocation, assign a product of the second highest priority type of the same family. Third, once products of the second highest priority type complete their allocation, assign capacity to a lot within the current family of the third highest priority type. This process can continue in this manner for lower and lower priority lots within a family. In some embodiments, priority can be divided into three groups where priority A is the highest priority and includes confirmed orders by customers, priority B is the second highest priority and includes production to buffer against peaks in demands, and priority C is the third highest priority and includes production based on forecasts of future demands.

In step 305, the planning system can analyze product demands based on data in a data store. Product demands can correspond to customer orders, previous customer orders, forecasted demands, targeted buffers for products, and the like. The data in the data store can be updated and the planning system can be configured to update its analysis of product demands in real-time.

In step 310, the planning system can be configured to determine categories of demand based on the analysis performed in step 305. Categories of demand can correspond to actual customer orders, buffers for demand peaks, and forecasted future demands. In some embodiments, the planning system can create additional categories of demand based on the analysis performed in step 305.

In step 315, the planning system generates priority levels for the determined categories. The planning system can assign priorities in a hierarchical structure so that high priorities are sequenced in a production plan before lower priorities. In some embodiments, the planning system retrieves priority levels from a data store to generate the priority levels. In this way, the planning system can utilize predetermined priority levels.

In step 320, the planning system assigns products to priority levels. The planning system can be configured to determine which products satisfy the demand categories and assign those products to associated priority levels. For example, products that fulfill customer orders are assigned to a demand category corresponding to customer orders and are consequently assigned to a corresponding priority level. In some embodiments, products that fulfill customer orders are given the highest priority.

Constraints on Scheduling

Figure 4:
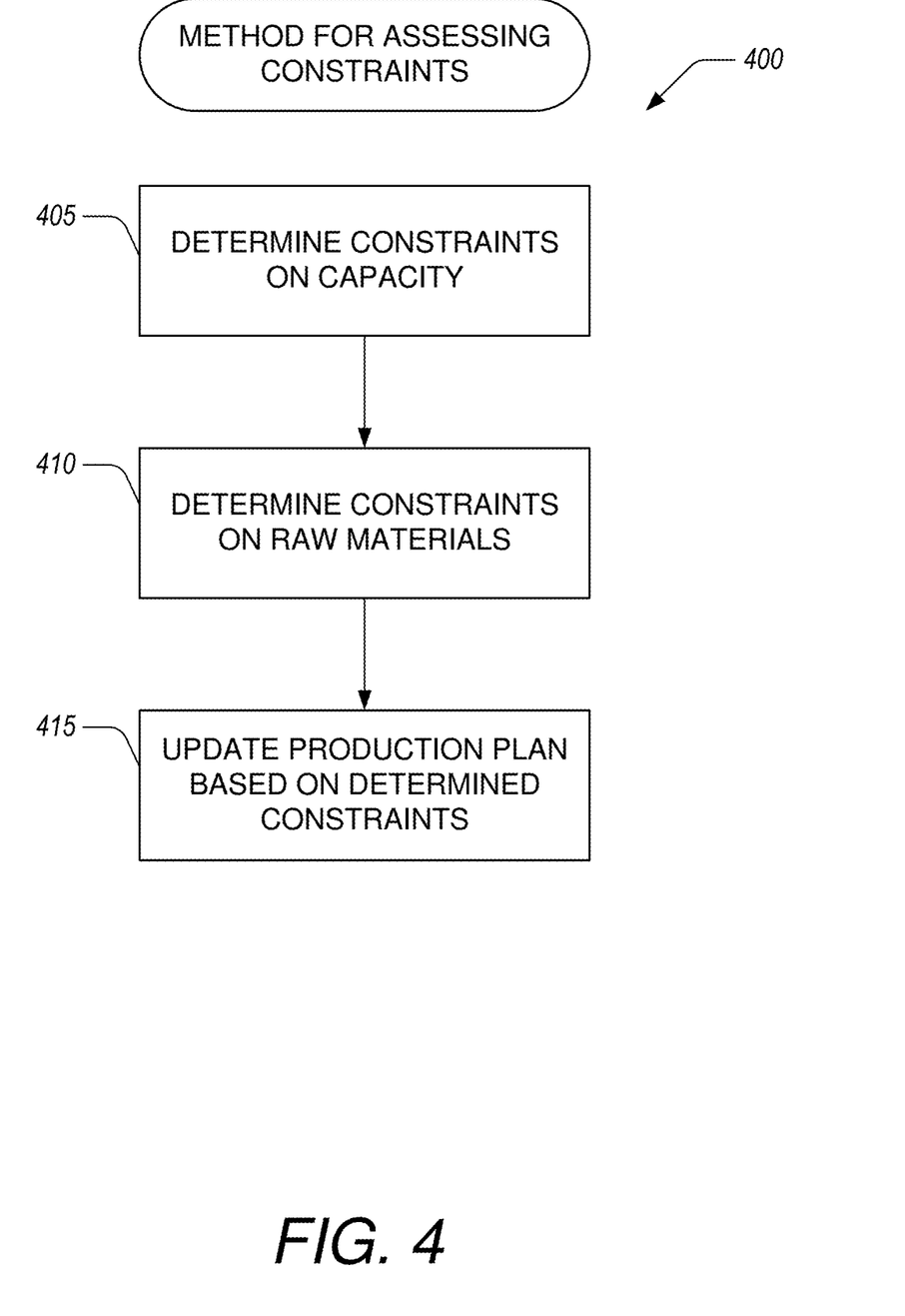
FIG. 4 illustrates a flow chart of an example method for assessing constraints on processing capacity.

FIG. 4 illustrates a flow chart of an example method 400 for assessing constraints on processing capacity. The method 400 can be implemented by the planning system 100 or the constraints module 130 described herein with reference to FIG. 1. For ease of description, the method 400 will be described as being performed by a planning system, such as the planning system 100 described herein with reference to FIG. 1. It should be understood, however, that any suitable system or module described herein can perform any step or any portion of a step in the method 400. Likewise, it should be understood that any suitable combination of systems or modules described herein can perform the method 400.

In step 405, the planning system determines constraints on capacity. This can correspond to a number of machines in a flow shop, the number of machines that are occupied, the number of machines that are suitable for use in a particular production or tests, and the like. The planning system can be configured to determine the capabilities of each machine as a relates to production or testing. For example, for each machine the planning system can be configured to determine which products can be used in the machine and the length of time each product would spend with each machine. The planning system, as it determines constraints on capacity, is configured to analyze production capacity in view of targeted production goals. Accordingly, the planning system is configured to assess whether a production plan can be accomplished given the determined capacity constraints.

In step 410, the planning system determines constraints on raw materials. This can correspond to the amount of raw materials in a flow shop that are available for production or testing. The planning system can be configured to determine the amount of raw material required for each product in production plan or in a test plan. The planning system, as it determines constraints on raw materials, is configured to analyze raw material capacity in view of targeted production goals. Accordingly, the planning system is configured to assess whether a production plan can be accomplished given the determined raw material constraints.

In step 415, the planning system updates a production plan based on the determined constraints. For example, if a production plan violates one or more constraints, the planning system can update the production plan to reduce production so that it does not violate these constraints. Similarly, the planning system updates a production plan to increase production if the proposed production plan falls below the determined constraints by a targeted amount. For example, if the proposed production plan falls to less than 75%, less than 60%, less than 50% of capacity, the planning system can update the production plan to increase production.

Changeovers

Figure 5:
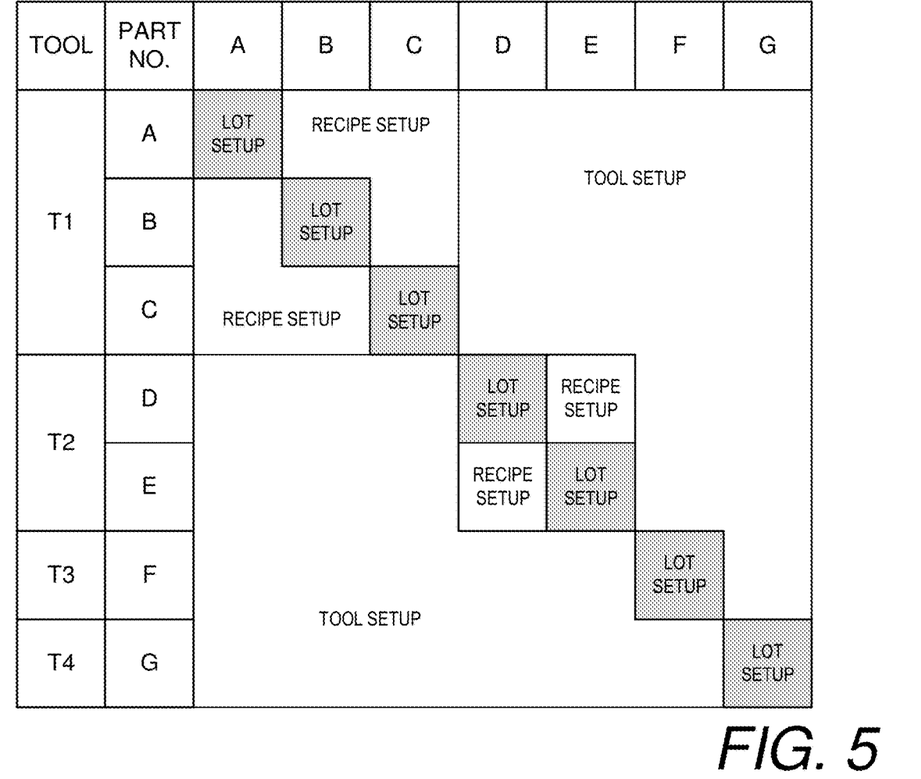
FIG. 5 illustrates a matrix demonstrating different kinds of changeovers and when they occur.

FIG. 5 illustrates a matrix demonstrating different kinds of changeovers and when they occur. The matrix includes tools T1, T2, T3, and T4. The matrix also includes part numbers A, B, C, D, E, F, G. Part numbers A, B, and C correspond to tools T1, part numbers D and E correspond to tool T2, part number F corresponds to tool T3, and part number G corresponds to tool T4. As shown by the matrix, when production switches between identical part numbers there is a lot set up that occurs. Similarly, when production switches between different part numbers that utilize the same tool, a recipe set up occurs. The matrix also shows that when production switches between different part numbers that utilize different tools, a tool set up occurs.

Figure 6:
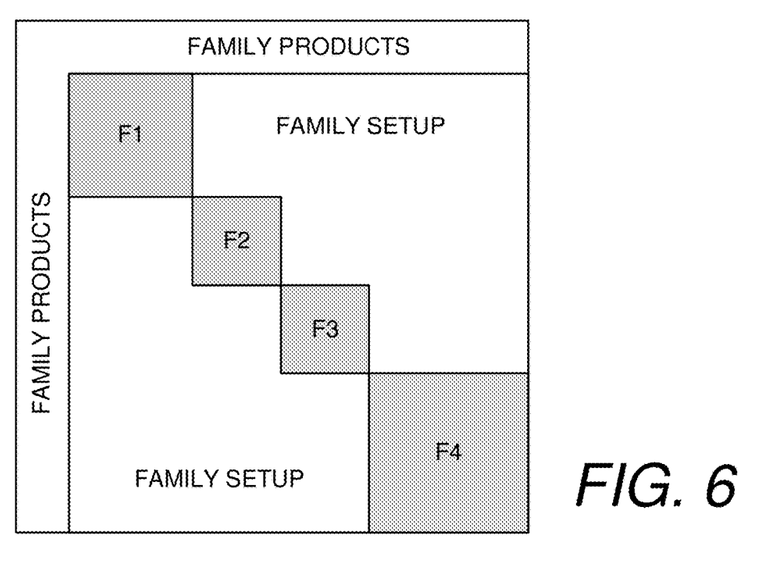
FIG. 6 illustrates a matrix demonstrating when changeovers occur when switching products families.

FIG. 6 illustrates a matrix demonstrating the changeovers occur when switching products families. The matrix includes 4 families: F1, F2, F3, and F4. The matrix shows that when production switches between different families, a family set up occurs.

As described herein, the changeovers that occur in the matrix of FIG. 5 represent minor or small changeovers. The changeovers that occur in the matrix of FIG. 6, however, represent a major or large changeover. In this context, the magnitude of a changeover corresponds to the length of time required to accomplish the changeover or set up.

Scheduling Production in a Flow Shop

Figure 7:
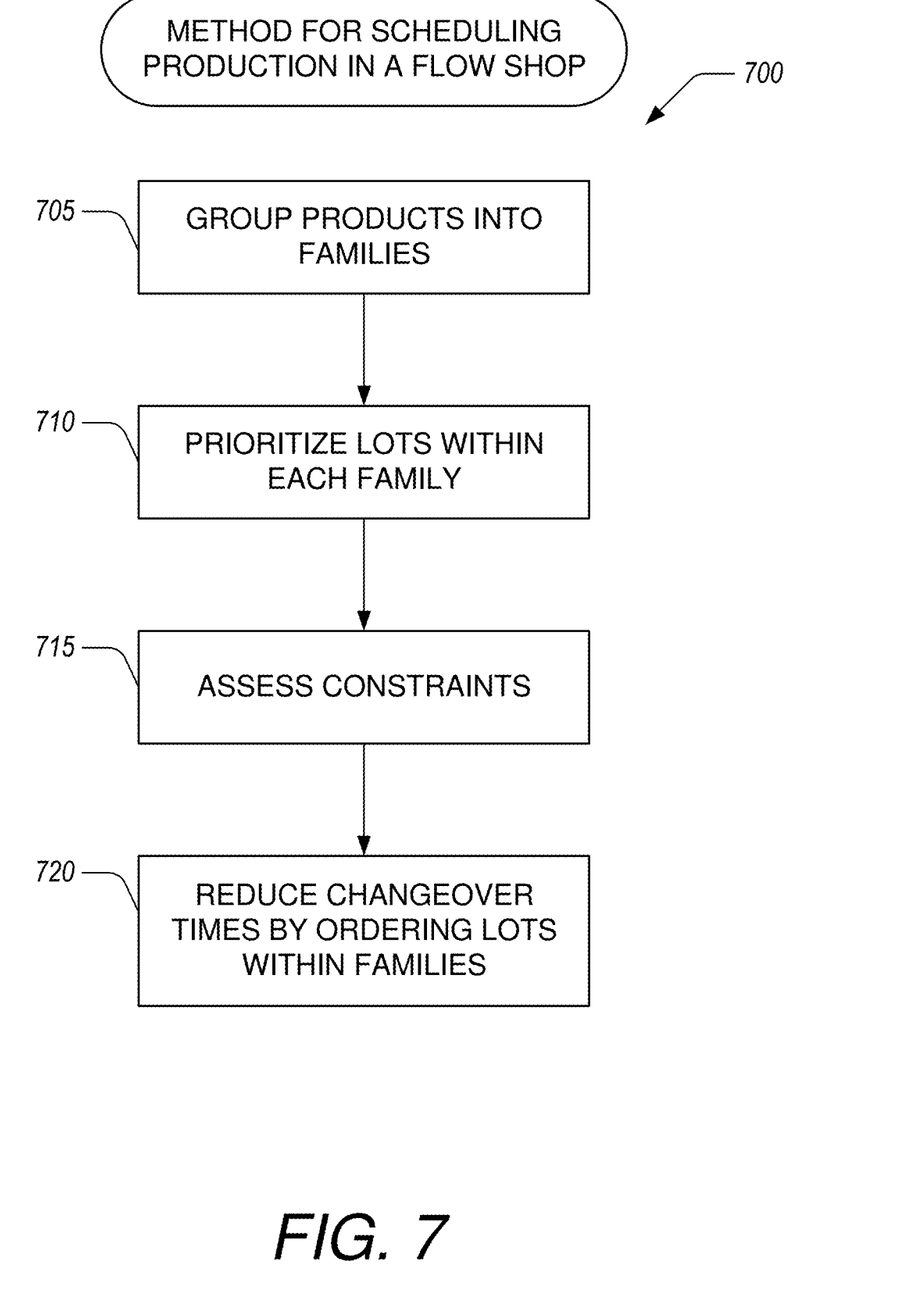
FIG. 7 illustrates a flow chart of an example method for scheduling production in a flow shop.

FIG. 7 illustrates a flow chart of an example method for scheduling production in a flow shop. The method 700 can be implemented by the planning system 100 or the scheduling module 140 described herein with reference to FIG. 1. For ease of description, the method 700 will be described as being performed by a planning system, such as the planning system 100 described herein with reference to FIG. 1. It should be understood, however, that any suitable system or module described herein can perform any step or any portion of a step in the method 700. Likewise, it should be understood that any suitable combination of systems or modules described herein can perform the method 700.

In step 705, the planning system group products into families. The planning system can utilize any suitable method for grouping products into families such as the method 200 described herein with reference to FIG. 2. In step 710, the planning system prioritizes lots within each family. The planning system can utilize any suitable method for prioritizing lots within a family such as the method 300 described herein with reference to FIG. 3. In step 715, the planning system assesses constraints. The planning system can utilize any suitable method for assessing constraints such as the method 400 described herein with reference to FIG. 4. In step 720, the planning system reduces changeover times by ordering lots within a family. The planning system can be configured to order lots so that minor setups occur prior to major setups. In some embodiments, changeovers can be arranged in a hierarchy ranging from smallest to largest such as lot setups, recipe setups, tool set up, and family changeovers. The planning system can be configured to generate a production plan based on the ordered lots within the families where the ordered lots are also based on priority. If the production plan that is generated by the planning system violates any constraints, the planning system is configured to iteratively reconfigure the order of lots so that constraints are not violated.

Figure 8:
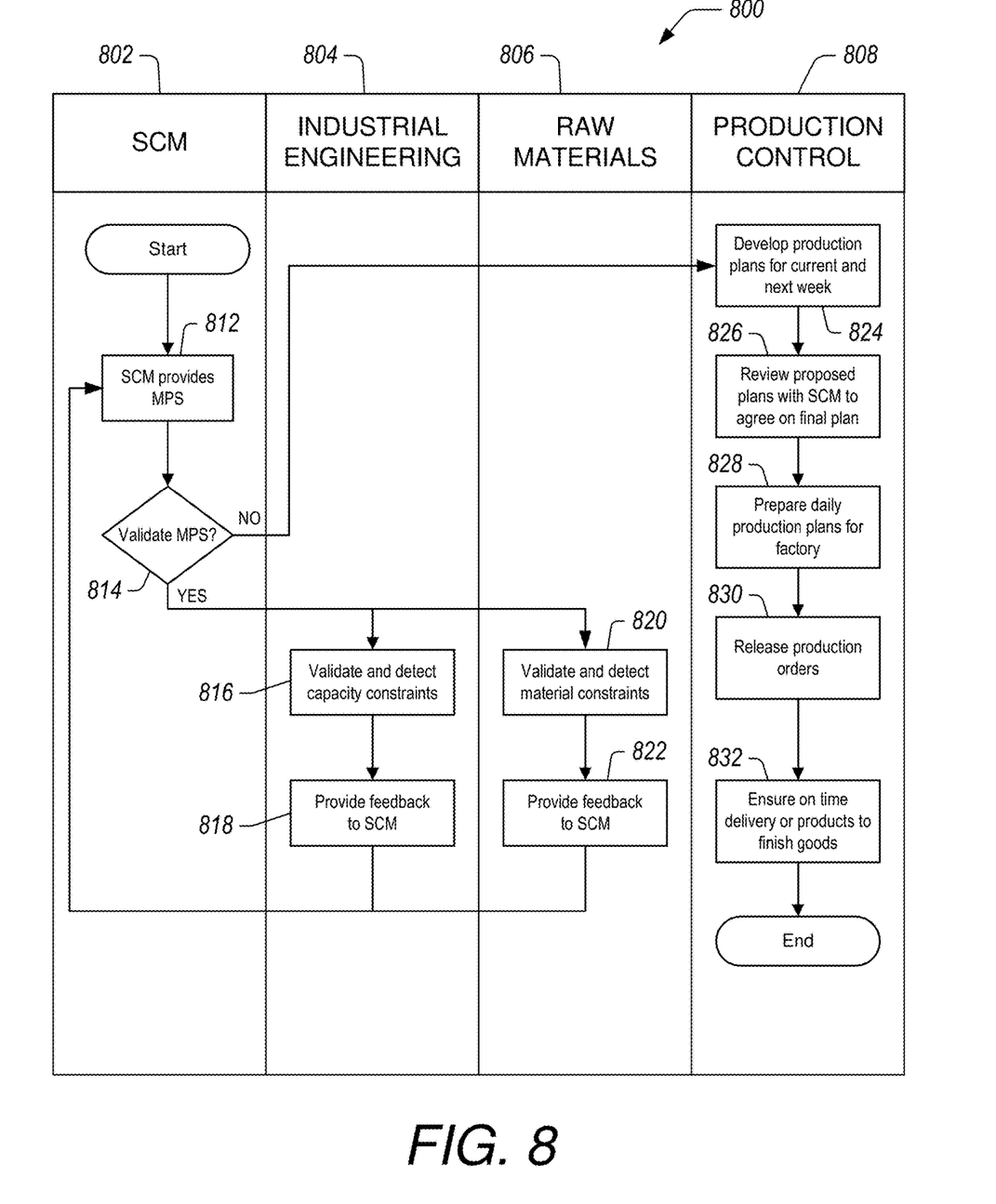
FIG. 8 illustrates an example of workflow to produce a production plan.

FIG. 8 illustrates an example of workflow to produce a production plan. Each component or entity can represent a system or module within a planning system or a production facility. A supply chain (SCM) 802 prepares a Master Production Schedule (MPS) in block 812. Industrial engineering 804 receives, validates and provides feedback to the MPS to indicate production capacity constraints along the production line in blocks 816 and 818. Industrial engineering 804 can be configured to indicate if it is feasible to process the required volume in block 818. Raw materials 806 is configured to receive, validate and provide feedback for material constraints to avoid delays in blocks 820 and 822.

Production control 808 develops a detailed production plan for the current week (n) and for the next week (n+1) in block 824. Production control 808 reviews the production plan generated by SCM 802 to verify the volume planned fir delivery in block 826. Production control 808 prepares a detailed daily production plan for the plant in block 828. The production plan can be configured to fill the installed capacity, achieve cost absorption levels, and/or fulfill on-time delivery orders (OTD). Production control 808 releases the orders to the workshop floor to implement the production schedule in block 830. Production control 808 also ensures on-time delivery for products to finish goods in block 832.

Figure 9:
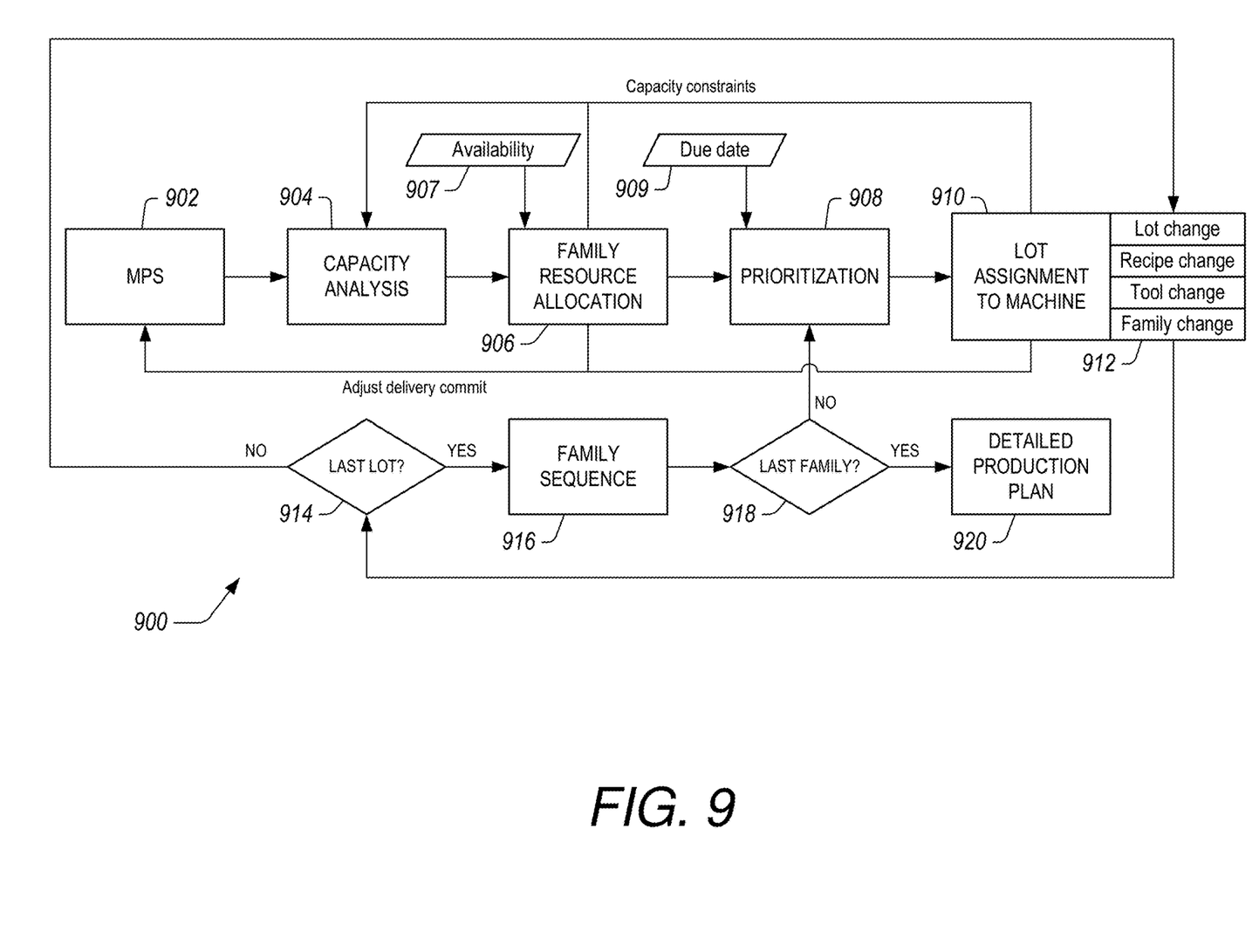
FIG. 9 illustrates a flowchart of an example method for generating a sequence for production plan.

FIG. 9 illustrates a flowchart of an example method 900 for generating a sequence for production plan. The demand signal embedded in the MPS 902 and the capacity analysis can be used as input. The information on demand and knowledge on product characteristics provide a way to generate a classification of the products on the family level. The method 900 also allows for assigning of delivery priority at the moment of assigning the lots to a machine. This is used to define the equipment to be assigned for each family. In the method 900, lots are first sequenced according to their highest priority (to produce for demand), followed by those with medium priority (to produce for inventory) and ending with the lowest priority (to produce for the forecast).

The master plan schedule (MPS) is generated in block 902. Capacity analysis is performed in block 904 based on capacity constraints provided by family resource allocation 906 and availability 907 as well as lot assignments in block 910. Family resource allocation is accomplished in block 906 and is based at least in part on availability of resources provided by availability data 907. Prioritization is accomplished in block 908 where an input to the prioritization block is due date information 909. Lot assignment to individual machines or groups of machines is accomplished in block 910. Based on the sequence of analyses provided in blocks 904, 906, 908, 910, delivery commitments can be adjusted using a feedback loop from the lot assignment block 910 to the MPS block 902.

The method 900 iterates through families and through lots. In block 914, a decision is made as to whether the last lot has been analyzed. If the answer is yes, the method proceeds to the family sequence block 916 where lots are ordered within a new family. The method then proceeds to determine whether the last family has been analyzed. If there are additional families, then the method proceeds back to the prioritization block 908 to prioritize lots within the family.

If the method has additional lots to analyze, the method proceeds to the setup block 912 to determine which type of setup is to be performed and the time required for that particular setup. Process flows back to the decision block 914.

If the last family has been analyzed, the method proceeds to produce a detailed production plan in block 920.

Simulation and Example Implementation of Planning System

The following description corresponds to testing of the proposed systems and methods using simulated data and controlled production runs in an electrical testing facility. Data from a sample production month were used to perform a simulation and then compare the results of the simulation to different theoretical scenarios. For the controlled production run, a planning system was implemented based on the systems and methods described herein. A single family was used to determine the efficiency of the disclosed planning systems and methods.

As a first step, products are grouped into families. To extract all geometries of the products that are manufactured and/or tested in the test facility and to group products into families, a product catalog and product portfolio were analyzed. Table 1 shows the number of geometric variations in the catalog and portfolio, where approximately 67% of the geometries are active. Thus, these products are in the highest demand and can be prioritized accordingly.

TABLE 1

| Products | Quantity | Geometries | Heights |
|---|---|---|---|
| Active | 556 | 70 | 11 |
| Inactive | 533 | 34 | 5 |
| Totals | 1089 | 104 | 16 |

Three product types were established based on priority. The priorities were classified according to a system having A-B-C categories of inventories. Category A is the highest priority, category B is middle priority, and category C is the lowest priority. A summary of these categorizations is shown in Table 2. The priorities are a function of the number of products to be produced and the demands associated with those products. Priorities can be assigned to products within the same family and can be arranged based on similarity of geometry and/or reduction of changeover ties between lots. Table 2 shows that different types of geometry can be in high demand and the variety of products can be relatively high, for example, resulting in about 66% of the demand concentrated in 35 part numbers. This can be considered high volume and high frequency for the products in priority category A.

TABLE 2

| Priority | A | B | C |
|---|---|---|---|
| Characteristics | High volume, high frequency | Medium volume, medium frequency | low volume, low frequency |
| Quantity | 65.90% | 24.75% | 9.35% |
| Part Numbers | 35 | 114 | 407 |
| Geometries | 8 | 12 | 50 |

As described herein, priorities for the planning and the simulation and controlled production run were assigned in the following manner. Products having category a prioritization were used to fill equipment capacity for a particular family. Products in category A correspond to confirmed orders by customers. Products of priority category B were assigned after products of category A were allocated. Products in category B correspond to products that buffer peaks in demand. Finally, products of priority category C were assigned after products of category B were allocated. Products in category C correspond to products that satisfy forecasted future demands.

To model a batch sequence, many activities were performed, starting with the definition of the setup types to set a relationship between product geometry and setup time. Once these times were determined, a study of the workshop information was used to build a general model of the lot sequencing.

The setup types were sorted according to their length from low to high as follows. The least amount of time corresponds to a lot setup. A lot setup is performed when the next lot in the sequence corresponds to the same part number or product. This adjustment process includes purging the equipment, cleaning the blower, and feeding a new lot.

The next changeover consumes more time than a lot setup and corresponds to a recipe setup. A recipe setup is performed when the next lot in the sequence has a different part number (e.g., is a different product) and the symmetry contactor is the same as the previous lot. This minor setup includes loading the recipe, correlating variables, and the activities related to a lot setup, as described above.

The next changeover consumes more time than a recipe setup and corresponds to a tool setup. A tool setup is performed when the next lot has a different part number and the contactor symmetry is not compatible with the current test tool. This changeover includes tool installation, fine-tuning, the activities associated with the recipe setup, and the activities associated with the lot setup, as described above.

The longest changeover time occurs when a new family is introduced or when a new product is introduced that has a dissimilar product geometry. A family setup is performed when the next batch has a different geometry, so that machine adjustments are performed on the handler and the tester. This major setup includes handler kit installation, handler fine-tuning, activities associated with a tool setup, activities associated with a recipe setup, and activities associated with a lot setup.

These machine setup activities were classified by sorting the changes from a minor setup (e.g., the lot setup) to a major setup (e.g., the family setup or batch change). The setup times for ranges of geometries and different example machines are shown in Table 3.

TABLE 3

| Geometric Ranges | Changeover Type | M1 (min.) | M2 (min.) |
|---|---|---|---|
| M1: 1 to 3.9 | Lot setup | 10 ± 2.5 | 8 ± 2 |
| M2: 1.6 to 2.8 | Recipe setup | 30 ± 5.5 | 45 ± 12.3 |
|  | Tool setup | 90 ± 13.2 | 135 ± 51.4 |
|  | Family setup | 290 ± 62.3 | 430 ± 93.2 |
| M1: 4 to 6.9 | Lot setup | 10 ± 2.5 | 8 ± 2 |
| M2: 2.9 to 4.5 | Recipe setup | 30 ± 4.8 | 45 ± 7.9 |
|  | Tool setup | 90 ± 7.8 | 98.2 ± 35.4 |
|  | Family setup | 210 ± 42.1 | 340 ± 38.4 |
| M1: 7 to 11 | Lot setup | 10 ± 2.5 | 8 ± 2 |
| M2: 4.6 to 5.5 | Recipe setup | 30 ± 3.2 | 45 ± 5.4 |
|  | Tool setup | 90 ± 6.2 | 89 ± 22.1 |
|  | Family setup | 170 ± 33.5 | 260 ± 25.1 |

A matrix of the machine changeovers according to the setup types was prepared for the products which belong to the same family (e.g., see FIG. 5). According to the data, a minor setup corresponds to a lot change. If the next product in the sequence shares the same installed tool, then a recipe change is performed. If the next product in the sequence is not compatible with the installed tools, then a tool setup is done. In the case where the next product geometry is different, a family setup is performed. Individual family matrices can be consolidated into a single matrix that includes all the families that are extracted from the product catalog.

Since each family has different adjustment times, three standard ranges of the geometries were established. This information was combined with information regarding machine type (e.g., M1 and M2) and is summarized in Table 3. A single matrix was structured that contains all the families that exist in the catalog (e.g., see FIG. 6). When changing from one family to another, a family changeover is performed and includes, as described herein, setting the handler, tool setup, recipe setup, lot setup, and cleaning. In contrast, if the change corresponds to products within the same family, these changeover times are considerably smaller.

Due to the nature of the test process of the electronic components, there are two machine types (M1 and M2). The information is grouped first by the machine and then by the package geometry range (e.g., family). Table 3 shows the machine setup times for particular kinds of setup adjustments. When the last lot of the last batch (family) is allocated, a detailed production plan is generated for a period of one week starting on Saturday at 12:00 a.m. and ending on Friday at 11:59 p.m. This means that each machine has totally 168 hours per week, with a tolerance of about 10%, therefore representing about 151.2 hours per week, per machine. This time includes production processing time in addition to any idle time due to a changeover (e.g., lot setup, recipe setup, tool setup, and/or family setup).

The process of production planning follows the workflow described herein with reference to FIG. 8. From a study of the information flows in the test area and an analysis of the setup structure, a general planning model was obtained, as described herein with reference to FIG. 9.

Data from a sample production month were used to perform a simulation and the results from the simulation were used to compare results from different simulated scenarios. The controlled testing within the electrical test facility was performed using a planning algorithm as disclosed herein. This was used to confirm the efficiency of the disclosed lot sequencing systems and methods.

To simulate the model, a family type A, corresponding to a geometry of 8.15×5.6 (which is used in three different part numbers) and a single tool type were selected. Table 4 shows adjustments or changeover times corresponding to changes between different products or set up times between products of the same part number. For example, a lot set up between products of the same part number takes 10 minutes, whereas a recipe set up between products of different part numbers takes 30 minutes. The selected family represents a product volume that fills a capacity equivalent to 80 M1 machines of 410 machines dedicated to performing electrical testing.

TABLE 4

| | Adjustments (min.) | | |
|---|---|---|---|
| Part No. | X-1 | X-2 | W-1 |
| X-1 | 10 | 30 | 30 |
| X-2 | 30 | 10 | 30 |
| W-1 | 30 | 30 | 10 |

To verify planning systems and methods disclosed herein, the information on the production volumes and the level of demand for each manufactured part number were obtained. The processed lots were filtered to correspond to the geometry 8.15×5.6 in a one-month test period. Table 5 shows an extracted section of lots with corresponding Part Nos. (e.g., products), which were processed during this month. Table 5 shows the volume of the processed lot and the lot cycle time. Qty In denotes the number of pieces in the lot when it arrives at the machine. Starting Process Time denotes the time the lot was loaded in the machine. End Process Time denotes the time the lot was unloaded from the machine. Qty Out denotes the number of good devices in the lot upon exiting the machine. It should be noted that some pieces were lost due to the natural process of segregation.

TABLE 5

| Lot | Part No. | Stage | Qty In | Start | End | Qty Out |
|---|---|---|---|---|---|---|
| 1 | X-2 | TEST | 7113 | 1/1 00:13:18 | 1/1 14:28:24 | 6836 |
| 2 | X-2 | TEST | 5486 | 1/1 14:39:24 | 1/2 01:59:17 | 4891 |
| 3 | X-2 | TEST | 6043 | 1/2 02:09:06 | 1/2 11:31:02 | 5971 |
| 4 | X-2 | TEST | 6769 | 1/2 11:40:51 | 1/2 23:32:21 | 6463 |

Table 5 demonstrates the times used to process each piece as well as different components of the testing process (e.g., feeding time, electric test time, withdrawal time, etc.). Table 6 shows times associated with testing the products. This data serves to calculate the time that each lot spends being tested on the machine. In this table, the Part No. denotes the part number. Pkg Size denotes the package geometry. Test Time denotes the electrical test cycle time. Index Time denotes the machine device feeding time. Threshold denotes the time that corresponds to withdrawal of the test devices from the test tool. Cycle Time denotes the complete test time per piece. The information can be used to calculate the average test processing time of individual products. The times are given in seconds.

TABLE 6

| Part No. | Pkg Size | Test Time | Index Time | Threshold | Cycle Time |
|---|---|---|---|---|---|
| X-1 | 8.15 × 5.6 | 1.10 | 0.00 | 0.14 | 1.24 |
| X-2 | 8.15 × 5.6 | 1.40 | 0.14 | 0.15 | 1.54 |
| W-1 | 8.15 × 5.6 | 1.15 | 0.14 | 0.15 | 1.29 |

To check the efficiency of the disclosed sequencing systems and methods, three scenarios of a test run were defined. First, a best case was defined as a test where only machines dedicated to a particular part number were considered. Thus, the idle time caused by the lot change was considered and other setup times were discarded. Second, a worst case was defined as sharing machines among different families. Thus, changing a lot introduces a family changeover or a family setup. Third, the modeled case was defined as a production plan produced by a system as disclosed herein. In such a plan, changes are made to reduce or minimize setup times, as described herein. The plan sequenced lots based on the volumes ordered by the customers according to priority and part number. The total time to complete processing (e.g., manufacturing or testing) is based on the quantity of product and the average processing time per product (e.g., quantity of product×average processing time of product). Setup times correspond to standard setup times for lot changes, recipe changes, tool changes, or family changes. Thus, the total time depends on the sequence of lots in the process and the similarity between those lots.

To calculate the simulated total processing time (Cmax), the start date on the electrical test was defined as 01.01.2016 at 12:00 a.m, and the entirety of the processed lots was sequenced on the machine. The cumulated time to process the total number of lots for this period was calculated using the following formula:

$$C_{max} = \sum_{f=1}^{F} \sum_{Pri=1}^{3} \sum_{m=1}^{M} \sum_{Prod=1}^{P} (Q_{f,Pri,m,Prod} \times St_{f,Pri,Prod} + \text{Lot setup}_{f,Pri,m,Prod} \times \text{Same } PartNo + \text{Recipe setup}_{f,Pri,m,Prod} \times \text{Different } ContactMask + \text{Tool setup}_{f,Pri,m,Prod} \times \text{Same } ContactMask + \text{Family setup}_{f,Pri,m,Prod} \times \text{Different geometry})$$

where the notations used are: Q—Quantity of pieces, St—Standard processing time, f—Family, Pri—Priority, m—Assigned machine, Prod—Product or Part Number.

The total time depends on the previous product or lot and the next product or lot on each machine. To account for this, four Boolean variables are defined which take the value 1 and multiply it by the value of a corresponding setup time or, if absent, take the value 0. The variables are as follows: Same PartNo—the previous part number in the sequence is the same; Same ContactMask—the symmetry of the contactors in the next lot is the same; Different ContactMask—the symmetry of the contactors in the next lot is different; Different Geometry—the product geometry in the part number of the next lot is different, where Same PartNo, Same ContactMask, Different ContactMask, Different Geometry∈ (0,1).

The lot processing time and the setup time of each processed lot is considered, and the family change is applied with a duration of approximately 210 minutes at the beginning of a monthly period. Table 7 presents the lot processing time for family 8.15×5.6 per scenario where the time is expressed in days.

TABLE 7

| Scenario | Start | Finish | CT (days) |
|---|---|---|---|
| Best | 1/1 00:00:00 | 1/23 02:07:00 | 22.09 |
| Worst | 1/1 00:00:00 | 1/31 06:47:00 | 30.28 |
| Proposed | 1/1 00:00:00 | 1/23 12:07:00 | 22.50 |

The information in Table 7 shows that in the case of moving from the proposed scenario to the best scenario results in a reduction of only 0.42 days of testing. The worst case scenario represents a family change for each lot processed in the factory. Accordingly, this indicates that the systems and methods disclosed herein, are relatively efficient and are near the best case scenario which assumes that all products being processed or equal. Comparing the proposed scenario to the worst-case scenario, a gain of about 7.78 days per month is shown. This corresponds to an increase of about 26% in the installed capacity at the factory.

The systems and methods described herein demonstrate the benefits of understanding product similarities. In particular, in a high tech semiconductor company with characteristics of high volume and high mix particular advantages can be realized when planning based on product similarities. The disclosed systems and methods provides a foundation and structure for a planning system to make a detailed short-term plan at the family level, to assign the required machines, to group products into the families, and to act quickly when a part number does not arrive as planned. By implementing the systems and methods described herein, a company could attract more customers, produce more products, increase the delivered volume to customers, and reduce operating costs, due at least in part to machine depreciation being amortized in a greater volume of products, thereby enhancing profitability for the company. The proposed systems and methods may be exportable to any discrete manufacturing business that sequences production orders.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for scheduling production in a flow shop, the method comprising:
    grouping products into families based on geometric similarities;
    within a family, grouping products into lots;
    prioritizing lots within individual families;
    determining a constraint on production capacity by analyzing a number of functioning machines in the flow shop;
    determining a constraint on raw materials associated with production by analyzing a quantity of available raw material;
    generating a production schedule that reduces changeover times by ordering lots within individual families; and
    updating the production schedule to produce an updated production schedule responsive to a determination that the production schedule violates the determined constraint on production capacity or the determined constraint on raw materials.

2. The method of claim 1 wherein grouping products into families comprises analyzing characteristics of products to determine common characteristics between products.

3. The method of claim 2 wherein grouping products into families further comprises assigning products to families wherein the products have identical geometries.

4. The method of claim 2 wherein grouping products into families further comprises assigning products to families wherein the products have geometries that differ by less than 5%.

5. The method of claim 1 wherein prioritizing lots within individual families comprises determining customer demands associated with products and assigning a higher priority to those products.

6. The method of claim 5 wherein prioritizing lots within individual families comprises assigning products to one of three priority levels.

7. The method of claim 6 wherein a highest priority level corresponds to products that fulfill customer demands.

8. The method of claim 7 wherein a lowest priority level corresponds to products that fulfill forecasted demands.

9. The method of claim 8 wherein a middle priority level corresponds to products that buffer peak demands.

10. The method of claim 1 further comprising allocating production resources for individual families.

11. The method of claim 1 further comprising assigning individual families to machines.

12. The method of claim 11 further comprising producing one or more products based on the updated production schedule.

13. A planning system configured to generate a production schedule, the planning system comprising:
    a family module configured to group products into families based on geometric properties;
    a priority module configured to prioritize lots within individual families;
    a constraints module configured to determine a constraint on production capacity by analyzing a number of functioning systems in a flow shop and to determine a constraint on raw material by analyzing a quantity of available raw materials;
    a scheduling module configured to generate a production schedule that reduces changeover times by ordering lots within individual families based on priority and geometric similarity and to update the production schedule to produce an updated production schedule responsive to a determination that the production schedule violates the determined constraint on production capacity or the determined constraint on raw materials; and
    a controller configured to control operation of one or more modules of the planning system.

14. The planning system of claim 13 further comprising a planning data store that includes information regarding geometric properties of products to be produced.

15. The planning system of claim 14 wherein the planning data store includes information regarding customer orders.

16. The planning system of claim 15 wherein the priority module is configured to analyze information regarding customer orders stored in the planning data store to prioritize lots within individual families.

17. The planning system of claim 14 wherein the family module is configured to analyze information regarding geometric properties of products to group products into families.

18. The planning system of claim 13 wherein the scheduling module is further configured to generate the production schedule so that products from different families are processed in parallel.

19. The planning system of claim 13 wherein the scheduling module is further configured to generate the production schedule so that products with a higher priority are processed before products with a lower priority.

20. The planning system of claim 19 wherein the priority module is configured to assign products to a higher priority where the products satisfy customer demands.

* * * * *